United States Patent
Desai et al.

(10) Patent No.: US 8,808,779 B2
(45) Date of Patent: Aug. 19, 2014

(54) METHOD FOR REDUCING THE OIL CONTENT OF POTATO CHIPS

(75) Inventors: Pravin Maganlal Desai, Carrollton, TX (US); Annette Stiers Jones, Carrollton, TX (US); Renu Mathew, Plano, TX (US); Donald Vaughn Neel, Highland Village, TX (US); Gerald Vogel, Plano, TX (US); Sheila Wright, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1661 days.

(21) Appl. No.: 11/777,839

(22) Filed: Jul. 13, 2007

(65) Prior Publication Data

US 2009/0017178 A1  Jan. 15, 2009

(51) Int. Cl.
 *A23L 1/015* (2006.01)
 *A23L 1/217* (2006.01)

(52) U.S. Cl.
 CPC .............. *A23L 1/0151* (2013.01); *A23L 1/217* (2013.01)
 USPC .......................................... 426/438; 426/637

(58) Field of Classification Search
 USPC ................................. 426/438, 637
 See application file for complete search history.

(56) References Cited

U.S. PATENT DOCUMENTS

| 4,277,510 | A |   | 7/1981 | Wicklund et al. |
| 4,537,786 | A |   | 8/1985 | Bernard |
| 4,721,625 | A | * | 1/1988 | Lee et al. ............ 426/438 |
| 4,738,193 | A |   | 4/1988 | Benson et al. |
| 4,741,912 | A |   | 5/1988 | Katz et al. |
| 4,749,579 | A |   | 6/1988 | Haydock et al. |
| 4,756,916 | A |   | 7/1988 | Dreher et al. |
| 4,806,377 | A |   | 2/1989 | Ellis et al. |
| 4,844,930 | A |   | 7/1989 | Mottur et al. |
| 4,863,750 | A |   | 9/1989 | Pawlak et al. |

(Continued)

FOREIGN PATENT DOCUMENTS

| GB | 2170396 | 6/1986 |
| GB | 2251366 | 8/1992 |

OTHER PUBLICATIONS

Abu-Ghannam : The effect of low temperature blanching on the texture of whole processed new potatoes; Department of Food Science and Environmental Health, Dublin Institute of Technology, Cathal Brugha St., Dublin 1, Ireland; Received Sep. 6, 2004; accepted Mar. 7, 2005; Available online May 4, 2005.*

(Continued)

*Primary Examiner* — Patricia George
(74) *Attorney, Agent, or Firm* — Shaukat A. Karjeker; Colin P. Cahoon; Carstens & Cahoon, LLP (57) ABSTRACT

A method is disclosed which reduces the oil content of a potato chip. The method teaches that a steeper, faster temperature drop upon initial introduction of the potato slice to the fryer, followed by a longer period of exposure to lower temperatures before increasing to standard frying temperatures, reduces oil content of a potato chip. The invention further discloses a pre-treatment method which involves submerging the potatoes in a hot water bath which results in decreased oil content. Additionally, the invention discloses a post-treatment method involving subjecting the potato chip to superheated steam that further reduces oil content. The two pre and post-treatment methods, combined with the primary temperature scheme method for reducing oil content, yield a potato chip with significantly reduced oil content.

23 Claims, 3 Drawing Sheets

(56) References Cited

U.S. PATENT DOCUMENTS

| | | |
|---|---|---|
| 4,867,049 A | 9/1989 | Johnson |
| 4,917,909 A | 4/1990 | Prosise |
| 4,917,919 A | 4/1990 | Geisler |
| 4,923,705 A | 5/1990 | Mottur et al. |
| 4,929,461 A * | 5/1990 | Schonauer et al. ............ 426/438 |
| 4,933,194 A | 6/1990 | Barry et al. |
| 4,933,199 A * | 6/1990 | Neel et al. ...................... 426/438 |
| 4,942,808 A | 7/1990 | Benson et al. |
| 4,956,189 A | 9/1990 | Johnson |
| 4,957,761 A * | 9/1990 | Hale ............................. 426/410 |
| 4,977,821 A | 12/1990 | Benson et al. |
| 4,980,187 A | 12/1990 | Johnson |
| 5,085,137 A | 2/1992 | Mottur et al. |
| 5,112,633 A | 5/1992 | Benson et al. |
| 5,137,740 A | 8/1992 | Benson et al. |
| 5,167,979 A | 12/1992 | Benson et al. |
| 5,171,600 A | 12/1992 | Young et al. |
| 5,188,859 A | 2/1993 | Lodge et al. |
| 5,312,635 A | 5/1994 | Kazlas et al. |
| 5,370,898 A | 12/1994 | Zussman |
| 5,429,834 A | 7/1995 | Addesso et al. |
| 5,441,758 A | 8/1995 | Lewis et al. |
| 5,580,598 A | 12/1996 | Benson et al. |
| 5,643,626 A | 7/1997 | Henson et al. |
| 5,846,589 A | 12/1998 | Baker et al. |
| 6,623,040 B1 | 9/2003 | Foley et al. |
| 2006/0019007 A1 * | 1/2006 | Baas et al. .................... 426/438 |

OTHER PUBLICATIONS

Don Giles, Consumers Crave that Old time Crunch; http://www.heatandcontrol.com/innovator_2005_1.asp; 2005 (second page).

R.L. Young & M.G. Scanlon, Effect of blanching conditions and starch swelling properties on textural . . . , http://ift.confex.com/ift/2002/techprogram/paper_11628.htm; Jun. 17, 2002.

Martin G. Scanlon, Ph.D., Potatoes: Solid Support for Potato Processing; http://www.umanitoba.ca/faculties/afs/food_science/staff/scanlon_martin_potato.html; Sep. 30, 2004.

* cited by examiner

METHOD FOR REDUCING THE OIL CONTENT OF POTATO CHIPS

CROSS-REFERENCE TO RELATED APPLICATION

None

BACKGROUND OF THE INVENTION

1. Technical Field

The present invention relates to an improved method for the production of reduced oil potato chips and more particularly to a method of controlling the oil-pickup within the fryer.

2. Description of Related Art

Commercial production of potato chips typically involves a continuous process wherein sliced potatoes are continuously introduced into a vat of frying oil at a temperature of about 365° F. (about 185° C.) or higher, conveyed through the oil by paddles or other means, and removed from the oil after about two and one-half to three minutes of frying by an endless conveyor belt when the moisture content of the chips has been reduced to about 2% by weight or less. The resulting product generally has texture and flavor characteristics which are usually recognizable by consumers as typical commercially produced continuous process potato chips.

Potato chips produced by batch processes in kettle fryers have texture and flavor characteristics which are usually recognized by consumers as being distinctly different from typical commercially produced continuous process potato chips. As the name implies, batch process kettle frying of potato chips involves placing a batch of potato slices in a kettle of hot oil, e.g., at a temperature of about 300° F. (about 150° C.). In the conventional kettle fryers used in the production of kettle-style chips, the cooking oil temperature follows a generally U-shaped time vs. temperature profile as illustrated in FIG. 5 of U.S. Pat. No. 5,643,626, assigned to the same assignee as the present invention, which is hereby incorporated by reference. Upon introduction of the potato slices into the oil, the temperature of the oil typically drops quite rapidly by as much as 50° F. (about 28° C.) or more. As depicted by the Figure, the oil temperature falls to a low point temperature of about 240° F. (116° C.) for a low point time of about 4 minutes. Heat to the kettle is then quickly increased and then the temperature of the oil begins to gradually rise, reaching about the initial frying temperature of about 300° F. (roughly 149-150° C.). The resultant potato chip has a moisture content of between 1.5% to 1.8% by weight. However, unlike Henson '626, which deals only with batch-fry applications, the present invention uses certain findings regarding frying temperature profiles to provide a method for actually controlling the amount of oil uptake in the fried product.

Batch fried chips are generally harder and crunchier than continuously fried chips and have a flavor that some consumers find more appealing than typical continuously fried commercial chips. It is believed in the art that the U-shaped temperature-time profile imparts the intense flavor and unique mouth feel characteristic of kettle-style chips. The commercially available kettle fryers, however, are relatively unsophisticated pieces of equipment that are significantly constrained by burner capacity and heat transfer capacity. Thus, the observed U-shaped temperature-time profile is unavoidable with the conventional kettle equipment, as the system cannot supply heat quickly enough to overcome the large heat sink created by the addition of a batch of raw potato slices. Changes in oil volume, initial fry temperature or potato batch weight will cause changes in temperature profile and finished product attributes. Therefore, the production of potato chips having the desired kettle-style attributes requires the adjustment of the process parameters in a manner that results in the U-shaped temperature-time profile.

Production rates using batch kettle fryers are dependent upon the equipment used. The modern kettles that are utilized in batch processes are generally manufactured of stainless steel, and vary in size and capacity. The kettles typically are heated by gas burners positioned directly under the kettle floor. Fryer capacities range from as few as 60 pounds per hour to up to 500 pounds per hour (finished product basis), although most batch fry operations have kettle fryers that can manufacture between 125 and 200 pounds of chips per hour. In order to efficiently use a batch kettle fryer of a given size, it is necessary to maintain a particular "load" or amount of potato slices per volume of oil, in order to achieve the desired frying temperatures. These and other constraints provide limits on the amount of throughput using batch kettle fryers. By contrast, potato chips made by a continuous process can employ continuous fryers capable of producing 1,000 to 5,000 pounds per hour of finished product. The kettle or batch process is therefore less economical than a continuous process.

In manufacturing kettle-style chips, some of the distinctive flavor and texture is believed to be attributable to the use of unwashed slices (as opposed to washed slices.) When washed, some of the surface starch and other matter that may contribute to flavor is removed. However, the slices are usually asitated during frying to prevent stickiness due to the presence of surface starch. It would therefore be desirable to help reduce stickiness while also retaining the surface starches believed to contribute to kettle-style texture and taste.

One very important product variable is die oil content. While low oil content is desirable for nutritional reasons, excessively low oil content levels result in poor taste and texture. Low oil content is desirable for yet another reason: marketing. The trend in the snack food industry has been to provide consumers with healthier options of food snacks. Many consumers prefer healthier alternatives to the traditional snack foods. As a result, there is great demand for healthier snack foods. One option of making the traditional potato chip healthier is by decreasing the oil content of the chip.

Traditional potato chips made by continuous-frying processes typically have oil contents ranging from about 34-38% oil by weight. The traditional batch-fried kettle chip has an oil content of about 30% oil. Interestingly, it was discovered that kettle-style potato chips produced from a continuous process (also known as "continuous-fried kettle chips," "continuous-kettle-fry chips" or "CKF chips") exhibit lower oil content ranges of about 20% to about 23% by weight (20060019007, page 15). Other differences between traditional (or regular) potato chips, batch-fried kettle chips, and continuous-fried kettle chips, include: differing rates of cooking; differing rates of heating; and differing rates of moisture evolution. For example: whereas regular potato chips are usually fried for 2-to-3 minutes at roughly 365° F. (about 185° C.) or higher, batch-fried kettle-style potato chips are typically fried for about 7-to-9 minutes within a temperature range of about 230° F. (roughly 110° C.) to a temperature no greater than about 400° F. (roughly 200° C.).

There are several known methods for reducing oil content. For example, U.S. Pat. No. 4,917,919 discloses a method of coating a potato with aqueous polyvinylpyrrolidone. However, the coated chip exhibits a moisture content of about 4% by weight, which greatly compromises shelf stability.

U.S. Pat. No. 4,537,786, also assigned to the same Assignee of the present invention, teaches using thicker potato slices to reduce oil content. It further teaches subjecting the fried chip to a stream of hot air which removes excess oil. Unfortunately, the hot air accelerates the oxidation of the oil and reduces shelf life.

Finally, U.S. Pat. No. 4,721,625 discloses subjecting the fried chip to saturated steam. However, like U.S. Pat. No. 4,917,919, this method results in increased moisture content and could require costly subsequent drying.

Thus, while some pre-treatment and post-treatment methods are known in the art, they are all limited in ability and have significant drawbacks. Additionally, there are virtually no methods known to reduce oil pick-up within the fryer. Consequently, a need exists that reduces oil take-up of potato chips while in the fryer.

SUMMARY OF THE INVENTION

The proposed invention provides a method for controlling the oil content of a potato chip to produce a reduced-oil-content potato chip as compared to typical fried potato chips. In particular, this invention provides a method for controlling the amount of oil uptake that the frying product—such as potato chips—exhibit while submerged in cooking oil. According to one embodiment that a steeper, faster temperature drop upon initial introduction of the potato slice to the fryer, followed by a longer period of exposure to lower temperatures of between about 220° F. (104° C.) and 260° F. (127° C.) (i.e., "low-cook period"), before increasing to standard frying temperatures, reduces oil content of a potato chip.

Whereas traditional tried potato chips ("core" product) often exit the fryer with up to 35% oil content by weight, batch-processed kettle-fried potato chips have comparatively lower oil content of approximately 30% or less by weight. Furthermore, it was found that by manipulating the temperature profile of frying chips—in batch- and continuous-frying applications, and particularly when making CKF-style product—the resulting oil content can be limited to about 20-22% by weight. In one embodiment of a frying method in accordance with the present invention, for example, oil content of a potato chip while in a fryer is reduced by the steps of: a) introducing a potato slice, which has not been fully cooked and preferably unwashed, into a cooking-oil fryer, wherein the cooking-oil fryer contains a body of cooking oil at an initial temperature of about 320° F. (160° C.); b) decreasing the temperature of the oil within the fryer from an initial temperature of about 320° F. (160° C.) to a reduced temperature between about 220° F. (104° C.) and about 260° F. (127° C.) within no more than about 3 minutes to about 5 minutes; c) maintaining the temperature of the oil, at least in the vicinity of the potato slice, below about 260° F. (127° C.) for a residence time of at least 3 minutes; and d) increasing the temperature of said potato slice to standard frying temperatures.

In one embodiment the potato chip oil content is further limited by a pre-treatment "hot potato effect" wherein the potato is submerged in a water bath at about 130° F. (54° C.) for a substantial amount of time sufficient to achieve complete temperature penetration. The hot potato effect can reduce/limit the future oil content/oil pickup. In one embodiment, the potato chip oil content is further reduced by a post-treatment blast of superheated steam at around 300° F. (149° C.). Tire superheated steam post treatment further reduces oil content. When both the pre- and post-treatment methods disclosed are used in a CKF process in conjunction with the modified temperature scheme of the instant invention, it is possible for the processed potato chips to exhibit a final oil content of less than 18% by weight.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
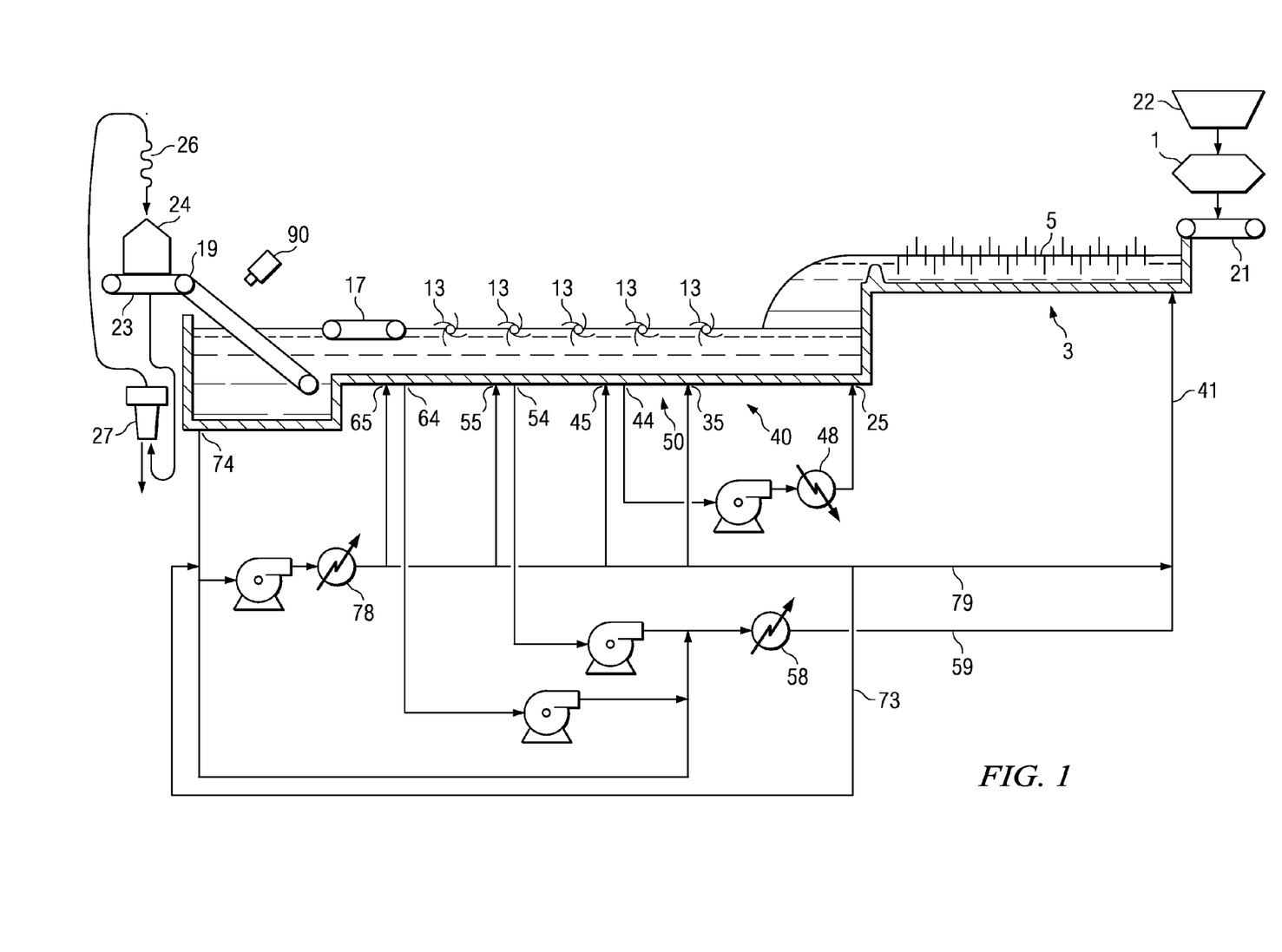
FIG. 1 is a schematic representation of the apparatus used for making continuous kettle-style potato chips in one embodiment of the present invention.
Figure 2:
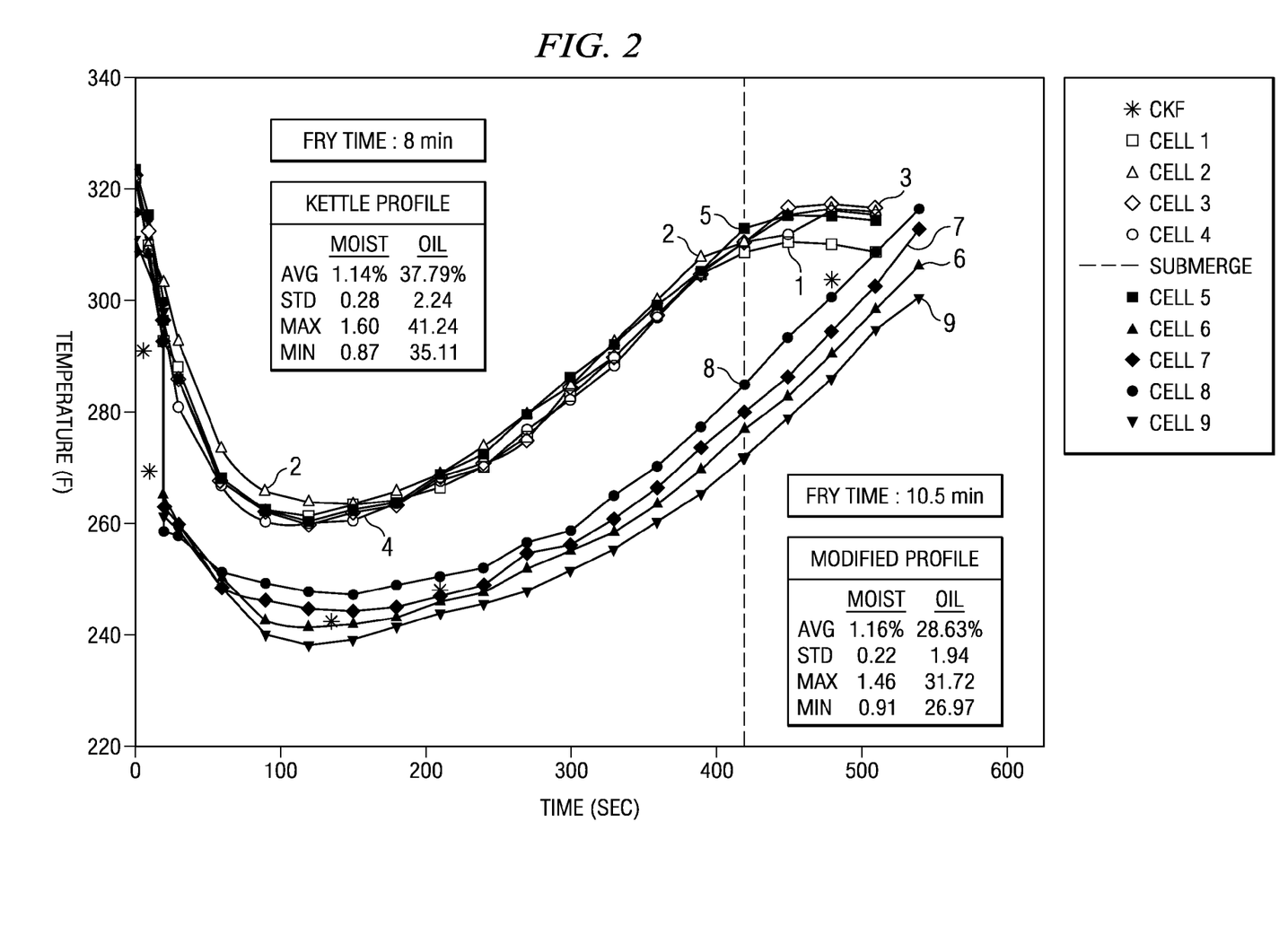
FIG. 2 is a graph comparing several temperature-versus-time profiles and the fried product's oil content recorded while frying test batches of potato slices.
Figure 3:
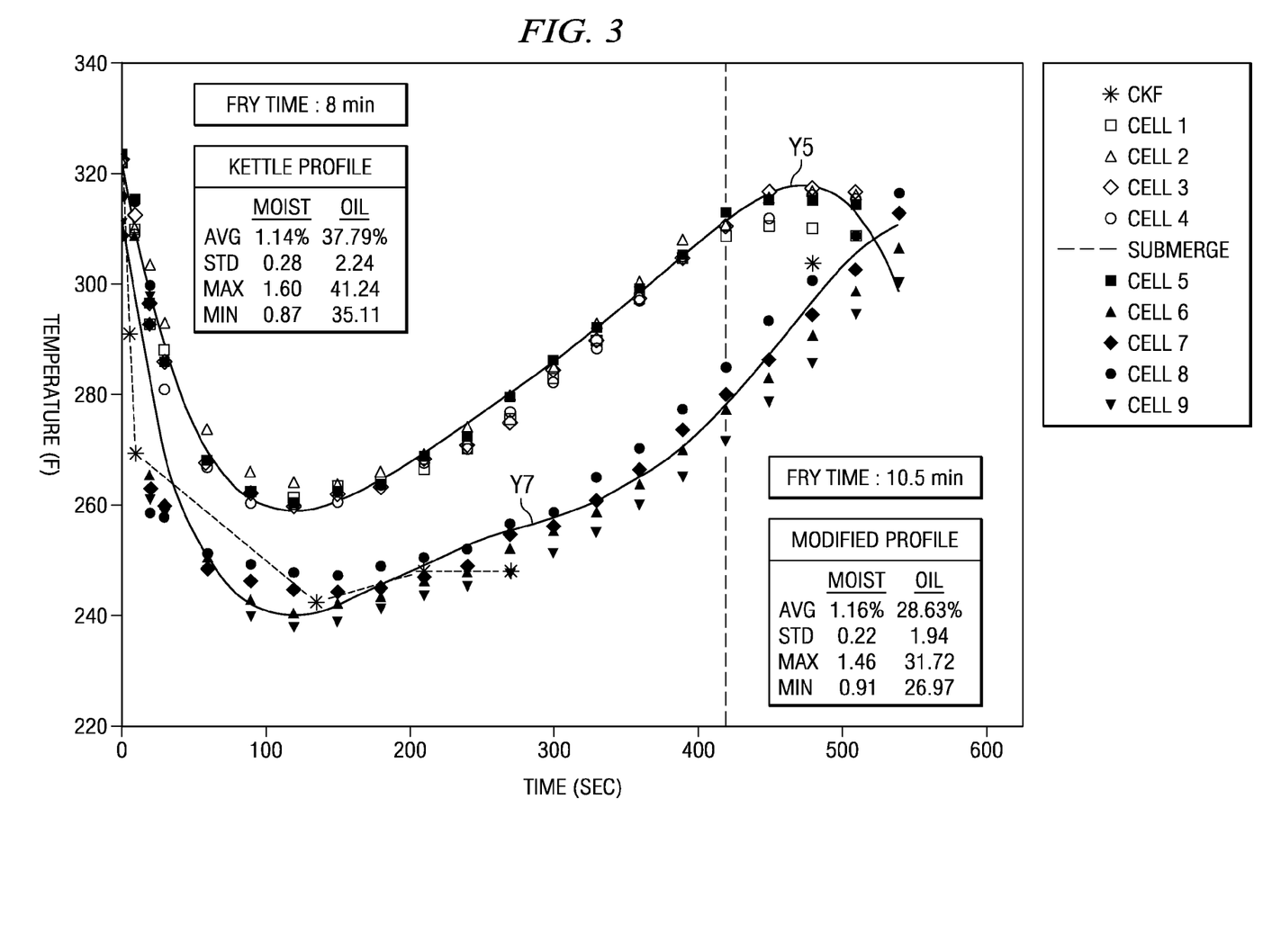
FIG. 3 is a graph containing the same data points as FIG. 2 but with two exemplary trendlines, with one trendline drawn through one of the higher temperature profiles, and one trendline drawn through one of the lower temperature profiles.

The purpose of the present invention is to provide a means for effectively reducing oil content in a potato chip. FIG. 1 shows a preferred embodiment for making continuous kettle chips which utilizes a pre-treatment method, a post-treatment method, as well as the primary method of reducing oil content while in the fryer. It is therefore possible for a potato chip produced by the embodiment of FIG. 1 to have an oil content of less than 18% by weight. FIG. 2 is a graph comparing several temperature-versus-time profiles and the fried product's oil content recorded while frying test batches of potato slices. FIG. 3 is a graph containing the same data points as FIG. 2 but with two exemplary trendlines, with one trendline drawn through one of the higher temperature profiles, and one trendline drawn through one of the lower temperature profiles. Although FIG. 1 shows one embodiment that produces continuous kettle chips, and FIGS. 2 and 3 show several preferable lower temperature profiles for frying, the current invention—including obvious variations thereof—can be applied to both batch and continuous processes of both kettle-styled and traditional continuous-process potato chips.

Pre-Treatment

The pre-treatment; method concerns a novel method termed the "hot potato" method. The hot potato method involves submerging whole-peeled potatoes in hot water for a period of time necessary to enable complete temperature penetration. The temperature should be about 130° F. (about 54° C.) to about 140° F. (about 60° C.).

The hot potato method has several benefits. It is believed to reduce surface damage during slicing, resulting in a smoother slice surface. Related Patent Application Publication 20060019007, in one embodiment (FIG. 2), describes a process where sliced and unwashed potatoes are introduced to the hot oil. Note that in continuous-kettle-fry (CKF) and in batch kettle processes, it is preferable for slices to remain unwashed after slicing, as this has been found to improve the texture of the finished product.

The hot potato method improves surface-starch retention of slices upon slicing. Experiments were completed to monitor free starch in control potatoes and "hot potatoes" after slicing. The results show that when the control potatoes were sliced, a significant amount of free starch was released from ruptured cell walls. However, the "hot potato" slices resulted in little or no free starch, and the slice surfaces appeared to be smoother and stronger with a greater proportion of the cell walls intact. Thus, the hot-potato method is also believed to enhance the texture of the finished product.

A second benefit of the hot potato method is that it can reduce (or control) the amount of the frying product's oil uptake, and thus enable the production of a filed product having a reduced oil content. The phrase, "reduced oil content," refers to the comparatively lower amount (or degree or rate) of oil adsorption (often referred to genetically as 'absorption') that occurs throughout the process of achieving a given final moisture content. It is believed that the hot potato method reduces the final product's oil content by gelatinizing starch and altering pectin structure. It is believed that this promotes the formation of a selectively permeable compound or matrix on the slice surfaces. The matrix is believed to be created by the interaction between Ca2+ and pectin-methylesterase (PME). The matrix readily forms at temperatures between 120° F. and 160° F., but is destroyed at higher temperatures. The water-permeable matrix allows moisture to depart the slices while hindering oil from permeating into the slices during the initial frying stages. Comparisons were conducted on control potatoes and "hot potatoes." After both groups had been fried, oil content data was collected. Indeed, chips manufactured with the hot potato method exhibited a reduction in oil content.

Post Treatment

The post treatment method utilizes superheated steam at about 300° F. (149° C.). Superheated steam is used in place of saturated steam or hot air because of the significant drawbacks associated with these alternatives. For example, saturated steam introduces condensation which in turn results in significantly increased moisture content on the chip. Hot air accelerates oxidation of the oil. Both of these drawbacks significantly reduce shelf life. The use of superheated steam decreases the drawbacks associated with saturated steam and hot air. The hotter the steam, and the greater the flow rate of steam per unit mass of fried chips, the lower the amount of condensation that will form. This decreases the need for an expensive dehydrator. The described method results in a moisture content of about 2% and farther reduces oil uptake.

Fryer Treatment

Oil content is a product characteristic that can be adjusted by manipulating the temperature-time profile in the fryer. More specifically, the inventors discovered quite surprisingly that oil content can be reduced by effecting a steeper, faster temperature drop upon initial introduction of the potato slice to the fryer, followed by a longer period of exposure to lower temperatures, and thereafter increasing to standard frying temperatures. Thus, the oil content of potato chips can be controlled by manipulating the temperature profile.

When producing potato chips, oil content can be decreased by following a steeper, faster temperature-time profile followed by longer exposure of at least about 3 to about 8 minutes within the temperature range of about 220° F. (about 104° C.) and about 260° F. (about 127° C.).

An embodiment of the innovative invention will now be described with reference to FIG. 1. FIG. 1 is a schematic representation of the apparatus used for making continuous kettle style potato chips in one embodiment of the present invention. The same reference numerals are used to identify the same corresponding elements throughout ail drawings unless otherwise noted. Although FIG. 1 is an example of a continuous process of making kettle style potato chips, the current invention is not so limited. The invention can be utilized to decrease oil content in both batch and continuous processes for producing both kettle and traditional continuous potato chips, as well as other fried potato products in general.

The potatoes are first peeled and then immersed whole into a water bath 22. The water bath 22 can vary in temperature from about 130° F. (about 54° C.) to about 140° F. (about 60° C.). The residence time of the potatoes in the bath can vary from about five minutes to about two hours, with a preferred range of about 20 minutes to about 80 minutes. The actual time required can be determined as the time necessary to allow complete temperature penetration of the potato. The apparatus includes a slicer 1 for slicing peeled potatoes to a thickness of between 0.058 inches to about 0.064 inches using, for example, an Urschel variable thickness slicer 1. The potato slices (preferably unwashed) are dropped onto a belt 21, such as a high speed flatwire belt 21, to achieve a monolayer distribution, and then fed into the upstream end of the oil flume 3 in a substantially monolayer arrangement to prevent sticking of the potato slices. The slices fall upon, and are conveyed away by, a high speed belt 21 such that singulated and monolayer slices are presented to the flume. This ensures minimal clustering and uniform exposure of all slices to the hot oil, thus minimizing potential for soft center formation. Heating oil enters the upstream portion of the flume 3 at the first oil inlet 41 at a flume oil temperature of between about 300° F. and about 320° F. (149° C.-160° C.). As used herein, heating oil is defined as cooking oil having a temperature above about 300° F. (149° C.). The potato slices are in the flume for a residence time of about 15 to about 20 seconds, which residence time helps set the surface starch to prevent product from sticking together in the fryer. In one embodiment, the flume 3 is agitated by a plurality of flume agitators 5 to ensure slice separation. The flume agitators 5 can comprise reciprocating paddles, rotating fingers, or other mixing elements known in the art. The flume 3 also sets the initial temperature of the potato slices as indicated at the far left side of the U-shaped temperature-time profiles appearing in FIGS. 2 and 3, which figures will be described, below, in more detail.

Because the flume 3 is maintained at a shallow depth (which depth can be controlled by the height of a weir, for example, at the flume discharge leading into the main portion of the fryer 40) in the flume area, there is a relatively large surface-area-to-volume ratio. Thus, the flume area of the fryer 40 can quickly transfer heat to, or quickly absorb heat from, the flume 3 and potato slices, which enables fast flash-off of surface water from the potato slices. In general, though, the temperature drop (if any) in the flume is minimal, on the order of a few degrees.

As the potato slices proceed downstream through the flume 3, a plurality of oscillating finger paddles (paddles that travel back and forth much like a clock pendulum), rotating finger paddles, drum paddles, dunkers, and/or rotating paddle wheels 13 can be used to continuously convey the slices through the flume 3 and the main portion of the fryer 40. Such oscillating and/or rotating members are used to control the clustering (defined as three or more potato chips sticking together) and to impart the non-uniform appearance typical of a batch kettle chip. These oscillating and/or rotating members are preferably adjustable for speed and duration of forward and backward movement.

The potato slices and flume 3 then discharge into the upstream portion of the fryer 40. As used herein, the upstream portion of the fryer 40 is defined as the general area between the second inlet 25 and the third inlet 35. The desired effect is that the oil temperature rapidly drops to a low-cook temperature range (and, at some point, a lowest temperature) in the upstream portion of the main fryer 40. A critical factor in producing the hard-bite kettle-style potato chip is the low-cook temperature range and the residence time. Additionally, as previously mentioned, the steepness of the curve, i.e. the speed at which the low-cook temperature range is reached, is a critical factor in reducing oil content. As used herein, low-temperature residence time is defined as the approximate amount of time it takes a potato slice to travel from: a) the approximate point in time in the upstream portion of the fryer 40 where the fryer oil temperature has nearly stopped decreasing (typically within 20 degrees Fahrenheit from the lowest oil temperature within the flyer; in FIGS. 2 and 3, for example, this is roughly 30 seconds and about 260° F. which is about 20 degrees from the low temperature of about 240° F. occurring at roughly 120 seconds), to b) the approximate point in time in the fryer where the fryer oil temperature has increased significantly above the lowest oil temperature within the fryer (which, for consistency, can be defined as about 20 degrees above the low temperature; in FIGS. 2 and 3, for example, this is roughly 260° F. occurring at about 300-360 seconds in the modified-temperature-profile experiments). As used herein, the low-cook temperature range includes any temperature in the temperature range that is within about 20° F. of the lowest oil temperature measured in the upstream portion of the fryer (e.g. substantially the trough section of the U-shaped temperature-time profile). In the modified-temperature-profile experiment results shown in FIGS. 2 and 3, for example, the low-temperature residence times were approximately 270-330 seconds. The low-cook temperature and low-temperature residence time can be better controlled by routing or injecting cooling oil into the upstream portion of the main fryer. As used herein, cooling oil is defined as a cooking oil having a temperature of less than about 250° F. (121° C.). Cooling oil can come from a number of sources including, but not limited to, fresh oil at ambient temperatures, or oil exiting the hot-oil cooler 48.

In one embodiment, hot oil from a first outlet 44 is pumped and cooled in a hot-oil cooler 48 to a temperature of about 120° F. (about 49° C.) before being routed to a second inlet 25 in the upstream portion of the fryer 40. The above temperature range is provided for illustration and not limitation. The optimal temperature or temperature range of hot oil exiting the hot-oil cooler 48 and entering the second inlet 25 can be determined based upon product flow (e.g. pounds per hour of potato slices in the fryer), oil flow in the fryer 40 and the flume 3, and the first oil inlet 41 oil temperature supplied to the flume 3. Use of a hot-oil cooler 48 enables the potato slices to achieve a low-cook temperatures between about 100° F. (about 38° C.) to about 260° F. (127° C.) and more preferably about 120° F. (about 49° C.) to about 160° F. (about 71° C.) for a low-temperature residence time of between about 3 to about 4 minutes. These lowered temperatures allow for the creation of a water-permeable matrix that inhibits, for a time, the ability of oil to permeate the potato slices, and therefore decreases oil take-up (or "oil uptake" or "oil pick-up"). Thus the exit temperature of the hot-oil cooler 48 can be adjusted to control formation of the matrix, and thus alter the resulting product oil content. The hot-oil cooler 48 can use cooling water or any other desirable fluid as the cooling medium. If necessary, fresh oil at ambient temperatures can also be used to supplement or coordinate with the hot-oil cooler 48 in order to achieve a set/predetermined exit temperature. As used herein, fresh oil at ambient temperatures is defined as cooking oil from a source other than the flume or fryer. The cooling oil from the hot-oil cooler 48 can ensure that the desired low-cook temperatures are affected for the desired low-tempera-ture residence time before heating oil is added to elevate the temperature in the main fryer to further dehydrate the potato slices.

Once the potato slices have reached the desired low-cook temperatures for the desired low-temperature residence time, the oil in the remaining portion of the fryer 50 is re-heated to mimic the temperature-time profile of a batch process. Thus, the temperature in the remaining portion 50 of the fryer increases as the potato slices move downstream. As used herein, the remaining portion of the fryer 50 is defined as the area generally downstream of the third inlet 35, or the location where heating oil is first injected after cooling oil is injected. This re-heating can be efficiently achieved by draining the cooler fryer oil through a plurality of oil outlets 44 54 64 while also adding heated hot oil to the fryer through a plurality of inlets 35 45 55 65. In one embodiment, oil inlets are placed downstream of oil outlets to avoid draining recently-added hot oil. Removal of cooler oil lessens the total oil volume that is re-heated. Depending upon the need, heating oil can enter the third inlet 35 at the temperature range desired to obtain the desired temperature-time profile. The temperature of the cooking oil at the first inlet 41, second inlet 25, third inlet 35, fourth inlet 45, fifth inlet 55, and sixth inlet 65 can be controlled in a number of ways recognizable to those skilled in the art. For example, the inlet temperatures can be varied by manipulating the outlet temperatures of the heat exchangers, including the main heat exchanger 78, the trim heat exchanger 58, and the cooling heat exchanger 48. In one embodiment, the main heat exchanger 78 and trim heat exchanger 58 use steam as a heating medium. In one embodiment, the main heat exchanger 78 has an exit oil temperature of between about 350° F. (176.7° C.) and about 400° F. (204.4° C.). Such a high temperature can increase the driving force to better enable the reheating of the oil in the fryer subsequent to the low point temperature. In one embodiment, a trim heat exchanger 58 is not used. The inlet oil temperatures can also be controlled by mixing cooling oil including, but cot limited, to, fresh oil at ambient temperatures, oil exiting the hot-oil cooler 48, or from a by-pass line that by-passes the heat exchangers 58 78, with the heated oil exiting the heat exchangers 58 78.

Once the potato slices have reached the desired low-cook temperatures for the desired low-temperature residence time, the potato slices are dehydrated to a potato slice exit moisture content of below 2%, and more preferably below about 1.5% by weight. As used herein, the potato slice exit moisture content is defined as the moisture content of the potato slices after exiting the fryer. In one embodiment, at least one of the oil inlet 35 45 55 65 temperatures is adjusted based upon the outlet moisture content of the potato slices as measured by a moisture-measuring device 90 situated in proximity of the outlet endless conveyor belt 19. A device model FL710, available from Infrared Engineering, of Irwindale, Calif., for example, can be used for a moisture-measuring device.

The oil flow, oil temperature, and submerger 17 speed can be varied, either independently or concurrently, to control the potato slice exit moisture content. For example, in one embodiment, the moisture control strategy comprises a cascaded process control approach to control the outlet oil temperature of the main heat exchanger 78. The moisture control algorithm comprises three cascaded control loops. Utilizing a cascaded approach allows each control loop to be optimally tuned to match the process control constraints, thus netting the best possible overall control performance. The outer-most loop is the moisture control loop. The intermediate control loop is a temperature controller with the setpoint being generated by the output of the outer control loop and utilizing the temperature at the outlet of the main heat exchanger 78 as the process control variable. The inner-most control loop controls a steam flow control valve at the main heat exchanger 78 based on a setpoint generated by the output of the intermediate control loop and utilizes steam pressure (which heats the oil in the main heat exchanger) as the process variable. Although steam is the preferred heating medium, other sources such as gas, thermal fluid, etc. can be used. This controlled cascade utilizes a recipe-driven product-moisture setpoint and leverages the moisture meter reading as the controlling process variable. Due to the long deadtimes associated with the process, a model predictive advance control software package was used in lieu of a traditional PID loop. Model predictive advance control software can be purchased from Fisher-Rosemount of Austin, Tex. or Honeywell Industrial Automation & Control of Phoenix, Ariz. Traditional control loops, in this situation, would typically need to be detuned to compensate for process lag, thus sacrificing process control performance. The advanced control software permits more aggressive and optimal process control. For example, the oil outlet temperature from the main heat exchanger 78 is continuously adjusted to keep the moisture content of the potato slices exiting the fryer between about 0.8% and about 2% by weight. If the moisture content set point is 1.4% and the moisture content increases above about 1.4% by weight, then a signal is transmitted to the temperature controller at the main heat exchanger 78 (intermediate loop), which will in turn transmit a signal to the control valve regulating steam pressure into the main heat exchanger 78 (inner loop), which will in turn control the flow of steam into the main heat exchanger 78. Moisture control with this invention can be achieved through regulation of the main heat exchanger hot oil temperature without affecting the temperatures of the oil entering the flume (flume oil temperature) or the cooled oil entering the low-temperature zone (cooling oil temperature). Although this example shows how moisture control over the last 3 zones of the fryer can be controlled independently by varying oil temperature alone (keeping oil flow and submerger speed constant), it should be noted that those skilled in the art, given the above explanation, will be able to control chip moisture independently or in combination with oil temperature, oil flow, and submerger speed as well.

In one embodiment, the temperature at the flume 3 can be adjusted accordingly by increasing or decreasing the percentage of flow of cooling oil, from, for example, a by-pass line that by-passes the heat exchanger 78 with the heated oil exiting the heat exchanger 78. Thus, hot-oil temperature can be manipulated without substantially changing the flow rates in the last 3 inlets 45 55 65. Likewise, oil flow can be manipulated without substantially changing the temperature in the last 3 inlets 45 55 65.

As the potato slices proceed downstream through the frying apparatus, a plurality of rotating finger paddles, drum paddles, paddle wheels, dunkers 13 and/or submerging conveyors 17 can be employed to control inter-slice behavior—i.e. to agitate the oil and potato slices to maintain slice separation and monolayer arrangement, or to collect and submerge the potato slices for increased efficiency and throughput—as the potato slices are dehydrated to a moisture content of less than about 2% and more preferably less than about 1.5%. Before the submerger 17, the potato slices are still somewhat sticky, so the oil and slices are agitated into a monolayer arrangement by paddle wheels 13 in order to prevent the slices from adhering or clumping together. Once the outer layers of the slices are sufficiently cooked and not sticky, the slices are ready to be bedded—via submerging conveyor 17, for example—to increase the throughput. The drum paddle 13 speed or submerging conveyor 17 speed can be varied to increase or decrease the dwell time of the potato slices in the fryer. In one embodiment, the drum paddle 13 speed and/or submerging conveyor 17 speed is adjusted based upon the outlet moisture content of the potato slices as measured by a moisture measuring device 90 situated above the outlet endless conveyor belt 19. In a preferred embodiment, both the submerging conveyor 17 speed and the last two inlet 55 65 temperatures are automatically varied by smart controls software to achieve an outlet moisture content of less than 2%, preferably about 1.4%.

The total dwell time of the potato slices in the sheer exiting 1 to the endless take-out conveyor 19 is about 7 to about 9 minutes. The oil content of the potato chips made by the above-described process is between about 26% to about 30% by weight, which can be lower than a kettle-style chip made in a traditional batch-fry process. The hot potato method enables a further decrease of about 2-5% by weight. Thus, when the hot potato effect and the modified temperature-time profile are combined, it is possible to achieve final oil content levels as low as about 20% to about 23% by weight.

Finally, the fried potato chip may be subjected to a post-frying treatment to further reduce oil content, if desired. In a preferred embodiment, the overall process includes this post-frying treatment. The conveyor 19 is connected to an additional conveyor 23. The additional conveyor 23 has a belt which is capable of allowing steam to pass. The belt can be made of a plastic material with holes, a loosely woven cloth, or a chain-linked material. The conveyor 23 brings the chips into the post-frying treatment hood 24. Inside the hood 24, the chip is blasted with superheated steam at about 300° F. (149° C.). The flow rate and temperature of the steam can be adjusted to yield a specified oil content as well as moisture content. The steam collects and removes excess oil from the chip. The steam and condensate flow past the conveyor 23 and are collected in the collection box 27. In the collection box 27, condensate and the removed oil are separated, and the excess steam is then reheated in a steam heater 26 wherein the steam is re-injected into the post-frying treatment hood 24. This post-frying treatment can result in a further decrease of oil content by about 4-5%.

The continuous frying system shown in FIG. 1 enables one to precisely control the frying-oil temperature and to maintain different temperatures in different areas. Thus, it is a powerful tool for frying potato chips and/or crisps according to a specifically-desired and/or pre-determined temperature-versos-time profile.

Examples

FIG. 2 is a graph comparing nine temperature-versus-time profiles (where each temperature profile is designated as CELL 1, CELL 2, etc., through CELL 9, and the corresponding data points are indicated by the cell numeral only: 1, 2, etc., through 9) and the fried product's resulting oil content that was recorded while trying test batches of potato slices. FIG. 3 is a graph containing the same data points as FIG. 2 but with two exemplary trendlines, with one trendline Y5 drawn through one of the higher temperature profiles, and one trendline Y7 drawn through one of the lower temperature profiles.

Referring to FIGS. 2 and 3, the five upper temperature profiles (CELLS 1-5) correspond to five control-sample batches of raw potato slices that were fried according to a standard kettle-style batch-fry process. The four lower temperature profiles (CELLS 5-9) correspond to four experimental batches of raw potato slices that were fried according to a modified kettle-style batch-fry process (i.e.—modified to subject the potato slices to a lower temperature profile). Note the characteristic U-shape exhibited in all of the temperature profiles—the upper temperature profiles (CELLS 1-5) and the lower temperature profiles (CELLS 6-9). Time is measured in seconds along the horizontal axis, while the temperature of the cooking/frying oil is measured in degrees Fahrenheit. For comparison, several temperature-time data points are also shown for an exemplary CKF (continuous-kettle-fry) process. A dashed, vertical line is used to denote the submersion time (or submersion point)—i.e. the point in time (during the exemplary CKF process shown, at about 420 seconds) at which the potato slices are fully-submerged—by using a submerger/submerging conveyor 17 as shown in FIG. 1, for example—so that the slices collect as bedded product under the submerger. Before this point, the slices cannot be submerged because they are or may still be sticky and are therefore prone to adhere together or clump together, which is undesirable.

Note that the control samples' upper temperature profiles indicate that the potato slices enter the fryer at about 320° F. (160° C.), generally within the range of 310° F. (154° C.) to 325° F. (163° C.). The fryer oil temperatures in the control samples quickly fall until they reach and remain in their low-cook temperature ranges of approximately 260° F. (127° C.) to 280° F. (138° C.), from about 45 seconds to about 300 seconds, and with the lowest temperatures occurring at about 110 seconds (or somewhere within 110-120 seconds). The temperatures then steadily rise from their low-cook temperature range, beginning at or just before 300 seconds (slowly rising from the lowest temperature at about 110 seconds) through 450 or even 500 seconds, depending on when the desired high-point temperature is reached. The frying/cooking oil surrounding the control samples generally reached their high-point temperatures of about 320° F. (160° C.) at about 450 seconds (or between about 420 seconds to about 480 seconds). The control samples required an average fry time of about 8 minutes (or 480 seconds) to reach an average moisture content of 1.14% by weight. The resulting fried potato chips in the control samples had an average oil content of about 38% by weight, with a minimum oil content of 35%, a maximum oil content of about 41%, and a standard deviation of about 2%.

Regarding the modified, lower temperature profiles and the characteristics of the resulting product: note that the experiment samples' lower temperature profiles indicate that the potato slices also enter the fryer at about 320° F. (160° C.), generally within the range of 310° F. (154° C.) to 325° F. (163° C.). The fryer oil temperatures in the experiment samples very quickly fall until they reach and remain in their low-cook temperature ranges of just below 240° F. (127° C.) to about 250° F. (121° C.), from about 30 seconds to about 350 seconds, and with the lowest temperatures, such as 238° F., occurring at about 110 seconds (or somewhere within 110-120 seconds). The temperatures then steadily rise from their low-cook temperature range, beginning at or just before 350 seconds (slowly rising from the lowest temperature at about 110 seconds) through about 500-540 seconds and beyond, depending on when the desired high-point temperature is reached. The frying/cooking oil surrounding the experiment samples generally reached their high-point temperatures of about 320° F. (160° C.) at about 540 seconds (or between about 500 seconds to about 540 seconds). The experiment samples required an average fry time of about 10.5 minutes (or 630 seconds) to reach an average moisture content of 1.16% by weight. The resulting fried potato chips in the experiment samples had an average oil content of about 28-29% by weight, with a minimum oil content of 27%, a maximum oil content of about 32%, and a standard deviation of about 2%.

If one compares the low-cook temperature ranges of the upper and lower temperature profiles—260° F. (127° C.) to 280° F. (138° C.), versus just below 240° F. (127° C.) to about 250° F. (121° C.)—there is an approximate temperature difference ranging from about 10° F. to about 40° F. throughout the low-cook temperature range. In fact, further visual Inspection of the upper temperature profiles versus the lower temperature profiles shows that this 10-to-40-degrees (Fahrenheit) difference is present nearly the entire time prior to substantially reaching the high-point oil temperatures, or prior to submergence of the potato slices in the main body of the fryer in a continuous-kettle-fry process.

In comparing the characteristics of the control samples (products of an unmodified kettle-style batch-fry process) to the characteristics of the experiment samples (products of a modified kettle-style batch-fry process), one can see that while the modified method and unmodified method achieve basically the same moisture content (roughly 1.1% to 1.2%), the lower temperature profile of the modified method results in significantly less oil uptake in the final product: average wt % oil content of 37/79% in control samples, versus 28.63% in experiment samples. Thus, the 10-to-40-degrees (Fahrenheit) downward shift of the U-shaped temperature profile corresponds to a 24% reduction in oil uptake (amount of decrease of the average oil content divided by the control group's average oil content).

This significant downward shift of the U-shaped temperature profile can be quantified by comparing best-fit (trendline) polynomial curves for the data sets, as shown in FIG. 3. For example, the temperatures in the fifth control batch (CELL 5) correlate with an R-squared ($R^2$) value of 0.9977 to the following function, with temperature (y) expressed as a function of time (x):

$$y=-3E-11x^5+4E-08x^4-3E-05x^3+0.0079x^2-1.0668x+310.74; R^2=0.9977$$

The temperatures in the second experiment batch (CELL 7) correlate with an R-squared ($R^2$) value of 0.9981 to the following function, with temperature (y) expressed as a function of time (x):

$$y=-2E-11x^5+3E-08x^4-2E-05x^3+0.0049x^2-0.6585x+275.95; R^2=0.9981$$

Both functions exhibit very similar characteristics—i.e. relatively the same order-of-magnitude coefficients for each polynomial degree—except that the experiment batch's (CELL 7) function has a constant that is about 35° F. lower than that of the control batch's function (275.95 versus 310.74). The best-fit function constants for the control samples ranged from 301.75 to 318.37, while the best-fit function constants for the experiment samples ranged from 267.35 to 279.91. Thus, when comparing the function constant of any one of the control batches to the function constant of any one of the experiment batches, the difference therebetween ranged from 21.84 to 51.02, which strongly correlates with the visibly apparent 10-to-40-degrees (Fahrenheit) downward shift of the U-shaped temperature profile.

The best-fit functions for all of the temperature profiles in FIGS. 2 and 3 are as follows (CELL 1 through CELL 9):

Control Group—Unmodified Temperature Profile $$y=-3E-11x^5+4E-08x^4-3E-05x^3+0.0076x2-1.0476x+311.63; R^2=0.9922$$

$$y=-3E-11x^5+4E-08x^4-2E-05x^3+0.0074x^2-1.0803x+318.37; R^2=0.9974$$

$y=-4E-11x^5+5E-08x^4-3E-05x^3+0.0085x^2-1.1074x+311.29; R2=0.9971$ $y=-3E-11x^5+4E-08x^4-2E-05x^3+0.0065x^2-0.8828x+301.75; R2=0.9975$ $y=-3E-11x^5+4E-08x^4-3E-05x^3+0.0079x^2-1.0668x+310.74; R2=0.9977$

Experiment Group—Modified Temperature Profile $y=-2E-11x^5+3E-08x^4-2E-05x^3+0.0057x^2-0.7674x+278.71; R2=0.9989$ $y=-2E-11x^5+3E-08x^4-2E-05x^3+0.0049x^2-0.6585x+275.95; R2=0.9981$ $y=-2E-11x^5+2E-08x^4-1E-05x^3+0.003x^2-0.4043x+267.35; R2=0.9994$ $y=-2E-11x^5+4E-08x^4-2E-05x^3+0.0066x^2-0.867x+279.91; R2=0.9989$ All of the best-fit functions share the following general properties:

$$y(x)=Ax^5+Bx^4+Cx^3+Dx^2+Ex+F$$

where the temperature, y, is a function of time, x; where A, B, C, D, and E are coefficients; and where F is a constant. More specifically:

coefficient A is a negative number having an order of magnitude of $10^{(-11)}$, alternatively notated E−11;

coefficient B is a positive number having an order of magnitude of or E−08;

coefficient C is a negative number having an order of magnitude of E−05;

coefficient D is a positive number having an order of magnitude of E−03;

coefficient E is a negative number having an order of magnitude of 1; and constant F is a positive number having an order of magnitude of hundreds.

In a modified frying-oil-temperature profile in accordance with a preferred embodiment of the present invention:

constant F is a positive number ranging in the upper two-hundreds but below three-hundred, and more preferably ranging from about 267 to 280.

Several experiments show the cumulative benefit of combining oil-uptake-reducing strategies, such as the hot-potato pre-treatment (e.g. whole, peeled potatoes, soak in 130° F.–140° F. for an hour), a modified (lowered) U-shaped trying-temperature profile, and post-fryer superheated-steam treatment:

| Moisture | Oil | Description |
| --- | --- | --- |
| 1.59% | 32.11% | no pre-treatment; unmodified T-profile |
| 1.60% | 41.24% | no pre-treatment; unmodified T-profile |
| 0.87% | 35.11% | no pre-treatment; unmodified T-profile |
| 0.91% | 26.97% | no pre-treatment; modified T-profile |
| 1.45% | 27.35% | no pre-treatment; modified T-profile |
| 1.61% | 28.91% | no pre-treatment; modified T-profile |
| 1.60% | 22.78% | hot-potato pre-treatment; modified T-profile |
| 1.77% | 23.95% | hot-potato pre-treatment; modified T-profile |

The hot-potato pre-treatment, followed by frying (which can be batch or continuous) in such a manner as to result in a modified temperature profile as previously described (U-shaped, reaching low-cook temperatures within the first two minutes—i.e. between 60 seconds and 120 seconds), and then finally combined with a post-fryer, superheated-steam treatment (which combination, in this case, yielded a further 4-5% wt. reduction in oil content), should enable the manufacture of fried potato chips having an oil content as low as 18% by weight. Moreover, the continuous fryer system shown in FIG. 1 can be used to fry product according to a specific temperature profile, such as one discussed above, in order to control the amount of oil uptake by the product.

Thus, in a preferred embodiment, the heating and cooling inlets and outlets for cooking oil in a continuous fryer system (as shown in FIG. 1) are employed and adjusted in order to follow a preferred temperature profile as explained above. For example, in one embodiment, a continuous fryer is supplied with oil flows of various temperatures by use of heat-exchanging oil-recirculation pathways connected to the heating and cooling inlets and outlets, and a plurality of oil temperature monitor-and-control loops are given various temperature setpoints throughout the length of the fryer (including the flume section and the main body) in order to follow a temperature profile according to the temperature-time function: $y=-2E-11x^5+2E-08x^4-1E-05x^3+0.003x^2-0.4043x+267.35$; $R2=0.9994$. More generally, a continuous fryer is used to establish a temperature profile defined as a function of time in the fryer: $y(x)=Ax^5+Bx^4+Cx^3+Dx^2+Ex+F$; where the temperature, y, is a function of time, x; where A, B, C, D, and E are coefficients; and where F is a constant; where:

coefficient A is a negative number having an order of magnitude of E−11; coefficient B is a positive number having an order of magnitude of or E−08; coefficient C is a negative number having an order of magnitude of E−05; coefficient D is a positive number having an order of magnitude of E−03; coefficient E is a negative number having an order of magnitude of 1; and constant F is a positive number ranging in the upper two-hundreds but below three-hundred, and more preferably ranging from about 267 to 280. To determine the appropriate oil temperature needed at any given downstream position in the frying apparatus (particularly at the oil inlets and outlets), one needs to determine the average length of time that product will have been in the fryer as it reaches that particular position (assuming continuous, steady-state flow, the longitudinal position of product within the fryer should correlate well with residence time). Then, the particular residence time for that position should be entered into the temperature-versus-time function to determine the appropriate temperature setpoint for that particular position.

While the invention has been particularly shown and described with reference to a preferred embodiment, it will be understood by those skilled in the art that various changes in form and detail may be made therein without departing from the spirit and scope of the invention.

We claim:

1. A method for reducing oil uptake of a potato chip while in a fryer, said method comprising the steps of:
   a) introducing an unwashed potato slice into a body of cooking oil, wherein the body of cooking oil has an initial temperature of about 320° F.;
   b) decreasing the initial temperature of the body of cooking oil from an initial temperature of about 320° F. to a reduced temperature between about 220° F. and about 260° F. within no more than about 3 minutes to about 5 minutes;
   c) maintaining the reduced temperature of the body of cooking oil, at least in a vicinity of the unwashed potato slice, below about 260° F. for a residence time of at least 3 minutes;
   d) increasing the reduced temperature of said unwashed potato slice to between about 230° F. to about 400° F.;

e) frying said unwashed potato slice, wherein said unwashed potato slice comprises an oil content of less than about 30% by weight; and said potato chip comprises an oil content of less than 20% by weight.

2. The method of claim 1 wherein said body of cooking oil is part of a batch process.

3. The method of claim 1 wherein said body of cooking oil is part of a continuous process.

4. The method of claim 1 wherein said potato chip is a kettle-style chip.

5. The method of claim 1 wherein said potato chip is a continuous process potato chip.

6. The method of claim 1 wherein said potato chip comprises an oil content of about 20% to about 23% by weight.

7. The method of claim 1 whereby said reduced temperature of step b) and said residence time of step c) are adjusted automatically and in real-time to further alter oil content.

8. The method of claim 1 whereby said reduced temperature of step b) ranges from just below 240° F. to about 260° F.

9. The method of claim 1 whereby said residence time of step c) is about 400 seconds.

10. A method for making a reduced-oil potato chip in a fryer comprising the steps of:
  a) submerging a whole potato in a water bath of about 130° F. to about 140° F. for a period of time necessary to allow complete temperature penetration;
  b) cutting said whole potato to form at least a potato slice;
  c) introducing said potato slice into a body of cooking oil within a fryer;
  d) decreasing a temperature of the body of cooking oil within the fryer from an initial temperature of about 320° F. to a reduced temperature of about 220° F. within the first 120 seconds;
  e) maintaining said body of cooking oil, at least within a vicinity of the potato slice, below 10 about 260° F. for a residence time of at least 3 minutes;
  f) increasing the temperature of the body of cooking oil, at least within a vicinity of the potato slice, to between about 230° F. to about 400° F.;
  g) frying said potato slice at between about 230° F. to about 400° F.;
  h) removing said potato slice from the fryer, wherein said potato slice comprises an oil content of less than about 30% by weight; and
  i) blasting said potato slice with superheated steam;

thereby producing a reduced-oil potato chip.

11. The method of claim 10 wherein said reduced-oil potato chip has an oil content of less than about 18% oil by weight.

12. The method of claim 10 wherein said submerging lasts about 20 to about 80 minutes.

13. The method of claim 10 wherein said submerging decreases an amount of free starch available on said potato slice.

14. The method of claim 10 wherein said blasting uses superheated steam at a temperature of about 300° F.

15. The method of claim 10 wherein said potato chip has a moisture content of less than 2% by weight.

16. The method of claim 10 wherein said potato chip has a moisture content of 1.3% by weight.

17. The method of claim 10 wherein said fryer is part of a batch process.

18. The method of claim 10 wherein said fryer is part of a continuous process.

19. The method of claim 1 wherein step e) comprises frying to a moisture content of below about 2%.

20. The method of claim 10 wherein step h) comprises removing said potato slice, wherein said potato slice has a moisture content of below about 2%.

21. The method of claim 10 wherein said steps occur sequentially.

22. The method of claim 1 wherein said steps occur sequentially.

23. The method of claim 7, wherein said body of cooking oil content refers to a quantity of oil.

* * * * *